United States Patent [19]
Lundquist et al.

[11] Patent Number: 5,414,730
[45] Date of Patent: May 9, 1995

[54] ASYNCHRONOUS SAMPLES DATA DEMODULATION SYSTEM

[75] Inventors: Alan E. Lundquist, Salt Lake City; John W. Zscheile, Jr., West-Farmington; Samuel C. Kingston, Salt Lake City, all of Utah

[73] Assignee: Unisys Corporation, Blue Bell, Pa.

[21] Appl. No.: 170,604

[22] Filed: Dec. 21, 1993

[51] Int. Cl.$^6$ ............................................. H04K 1/00
[52] U.S. Cl. ...................................... 375/208; 380/34
[58] Field of Search ............................... 375/1; 380/34

[56] References Cited

U.S. PATENT DOCUMENTS

| | | | |
|---|---|---|---|
| 4,933,952 | 6/1990 | Albrieux et al. | 375/1 |
| 5,099,494 | 3/1992 | Kingston et al. | 375/1 |
| 5,101,370 | 3/1992 | Kingston et al. | 364/733 |
| 5,253,268 | 10/1993 | Omura et al. | 375/1 |
| 5,315,615 | 5/1994 | Delisle et al. | 375/1 |

Primary Examiner—Tod R. Swann
Attorney, Agent, or Firm—John B. Sowell; Mark T. Starr

[57] ABSTRACT

A novel PN code acquisition and demodulation circuit comprise an analog receiver coupled to an analog to digital converter. The digital output of the converter is passed through an N chip width parallel correlator. The parallel outputs are coherently accumulated to provide N soft decision data values one of which is indicative of the proper replica code for locking onto the data. All of the soft decision data values are stored in a high speed memory in real time. Subsequently non-coherent accumulated soft decision data is employed to detect the proper PN replica code. Logic selection means accesses the soft decision data stored in the high speed memory in non real time and selects the best estimate for the soft decision data and applies the soft decision data to a demodulator in non-real time to recover the hard data encoded in the received PN coded data.

11 Claims, 2 Drawing Sheets

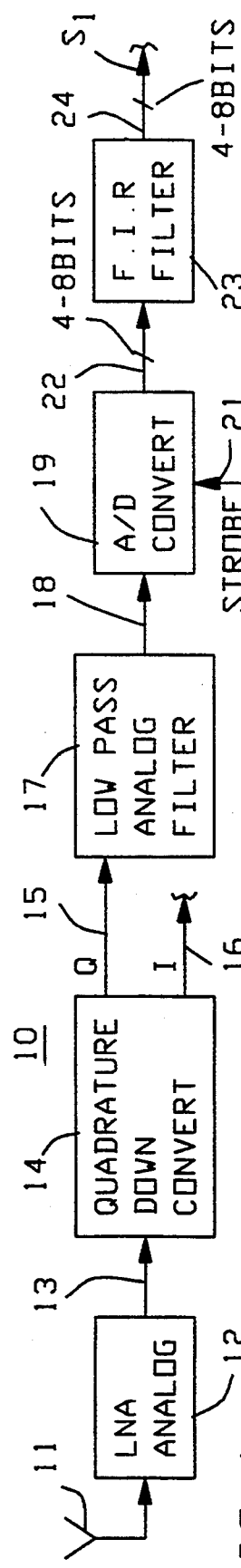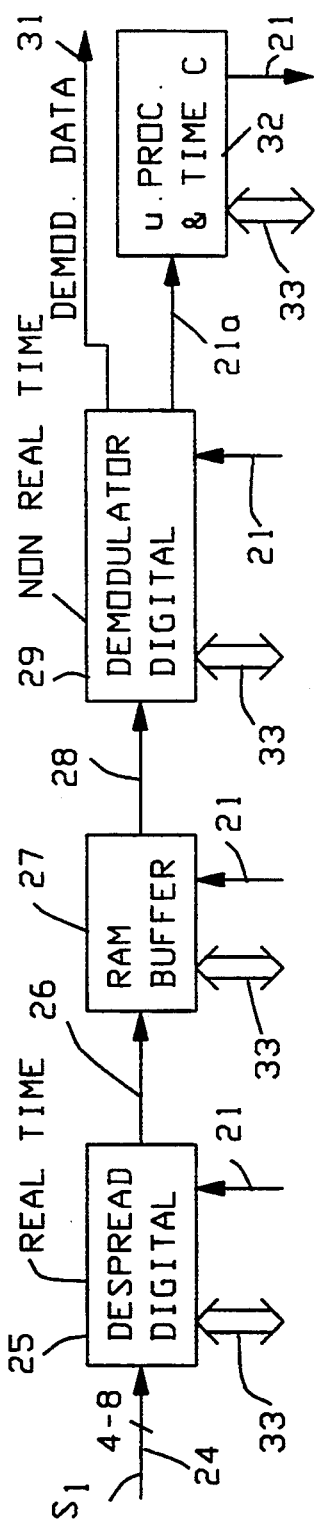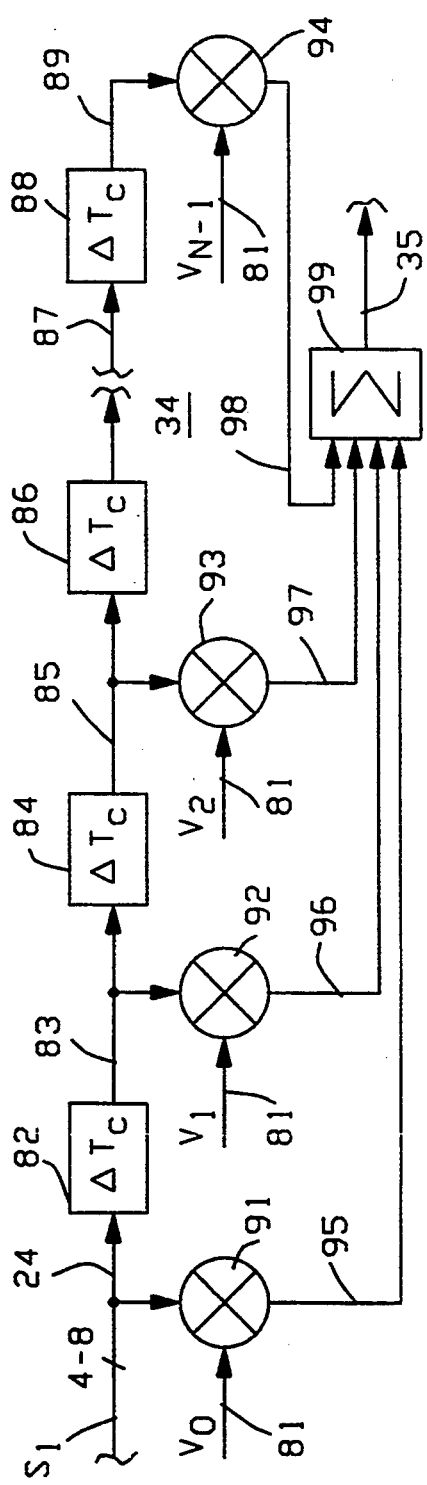

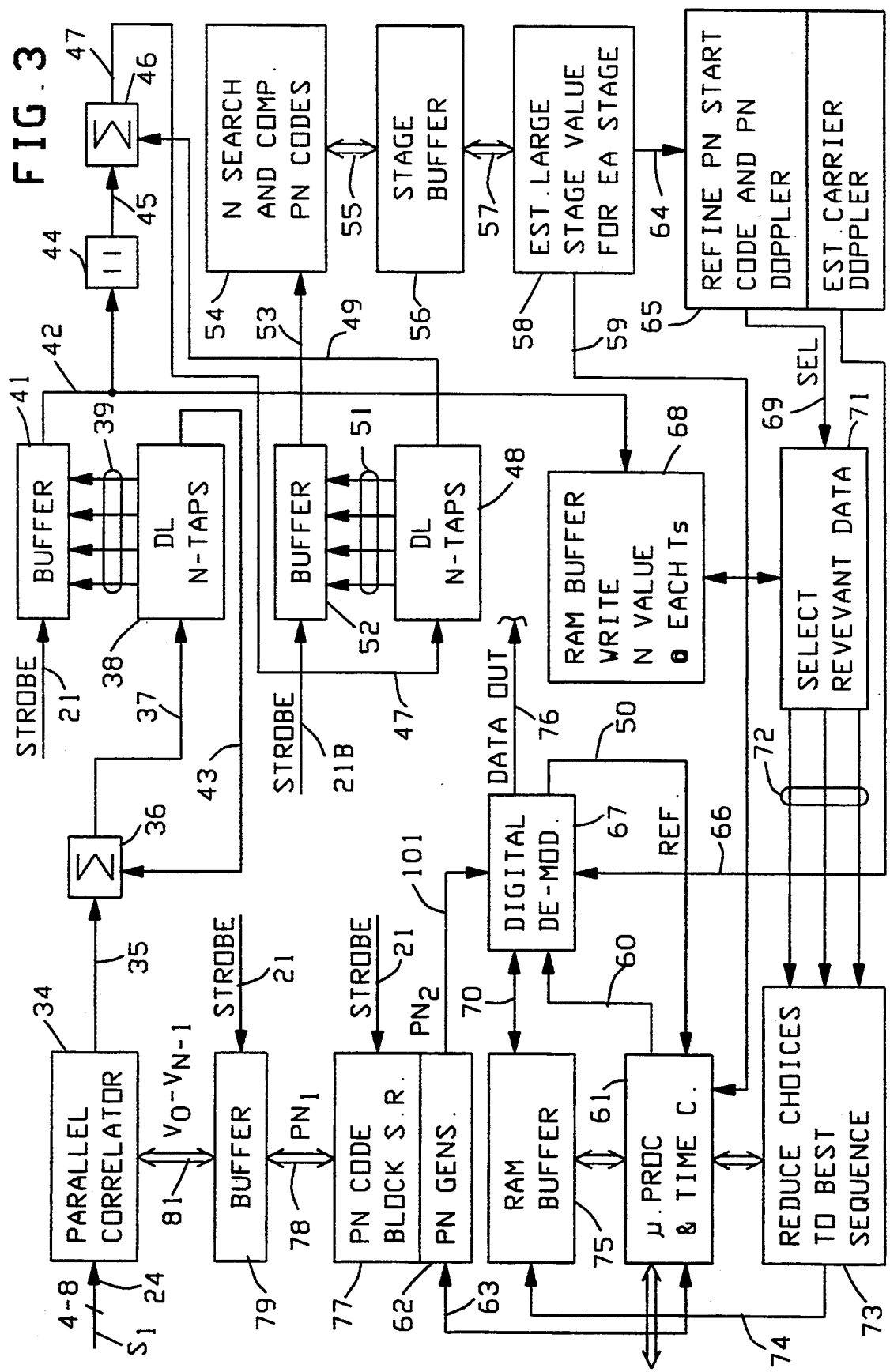

ASYNCHRONOUS SAMPLES DATA DEMODULATION SYSTEM

BACKGROUND OF INVENTION

1. Field of Invention

The present invention relates to a system for acquiring and demodulating burst of PN coded data in near real time. More particularly, the present invention relates to a system that is adapted to receive burst transmission of spread spectrum data and rapidly acquire and track the data when known to be in a predetermined window of uncertainty employing a novel parallel despreader.

2. Description of the Prior Art

Heretofore analog and digital acquisition and demodulation systems were known. In our U.S. Pat. Nos. 5,101,370 and 5,099,494 there is shown and described a digital accumulator and scaler and a six channel digital demodulator used in digital acquisitions systems. These circuits were employed to search a maximum window of uncertainty and to acquire (lock-on) and track a received PN code, preferably in a quadrature phase shift keyed (QPSK) format, and further employed a real and imaginary channel for receiving data.

During a search sequence, the PN code was incrementally shifted one-half or at most one chip to acquire the incoming code. The acquisition and demodulation of the incoming signals were recovered using a fixed or variable dwell time before slipping the PN code in an attempt to achieve lock-on of the replica PN code. It is known that variable dwell time will produce faster acquisition than fixed dwell time by quickly rejecting the wrong signal. Heretofore, it was known that correlators could be employed to speed up acquisition of a received code. There is a present hardware limitation as to the number of stages that such correlators may employ before becoming impractical or inefficient for use in a high processing gain acquisition system. It is known that high processing gain acquisition systems employ a very large number of chips which is not compatible with use of a correlator.

The above acquisition system assumes that a replica PN code acquires (locks on) the received signal. When the received signal is a burst of information of known length without a synchronizing header it is virtually impossible to acquire (lock on) to the received signal.

It would be desirable to provide an asynchronous acquisition and demodulation system for spread spectrum codes which employ a highly efficient parallel correlator that may be used with high processing gain acquisition systems to process burst of information without a header.

SUMMARY OF THE INVENTION

It is a primary object of the present invention to provide a novel high processing gain acquisition system.

It is a primary object of the present invention to provide a high processing gain acquisition system having a novel parallel correlator.

It is a primary object of the present invention to provide a high processing gain acquisition system useful in acquiring bursts of PN spread spectrum information.

It is a primary object of the present invention to provide a high. processing gain acquisition system for receiving and demodulating burst of spread spectrum data without complete code synchronization.

It is a primary object of the present invention to provide a novel high processing gain acquisition system that does not require a data preamble or header.

It is a primary object of the present invention to provide a novel high processing gain acquisition system which despreads the PN code in real time and subsequently demodulates the stored soft decision data in non-real time.

It is a primary object of the present invention to provide a novel acquisition and demodulation system capable of acquiring a single burst of PN spread spectrum information when known to be within a predetermined window of uncertainty without requiring a conventional of locking of PN codes.

It is another object of the present invention to provide a novel acquisition system which improves on demodulation sensitivity by eliminating worst case timing sample errors.

According to these and other objects of the present invention there is provided a novel PN code acquisition and demodulation circuit. The circuit system includes an analog front end receiver and an analog-to-digital converter which provides real time digital samples of a burst of spread spectrum information. The burst samples are processed in parallel and partially despread in a novel parallel correlator employing coherent correlation of the information over a bit symbol or a data sample time. The partially despread output from the parallel correlator is coherently accumulated and stored as preliminary or soft decision data then processed in acquisition circuits and demodulation circuits. The acquisition circuits continue a non-coherent correlation of the soft decision data over multiple data samples to enable a determination of the proper PN code alignment for acquisition, The stored parallel correlation despread samples taken from the burst of information are processed as soft decision data to produce a single stream of data modulated by the carrier and code phase shift. The stream of modulated data is further refined and demodulated to remove effects of the carrier and code and doppler phase shift and to provide hard data.

BRIEF DESCRIPTION OF THE DRAWINGS

FIG. 1 is a schematic block diagram of a typical front end receiver;

FIG. 2 is a schematic block diagram broadly showing a synchronous real time despreader operating in conjunction with an asynchronous non-real time demodulator;

FIG. 3 is a more detailed schematic block diagram of the acquisition and demodulation system broadly shown in FIG. 2; and FIG. 4 is a more detailed schematic block diagram of a preferred embodiment parallel correlator of the type useful in FIG. 3.

DESCRIPTION OF THE PREFERRED EMBODIMENT

Refer now to FIG. 1 showing a schematic block diagram of a preferred front end receiver 10 shown having an antenna 11 coupled to a low noise amplifier 12. The output of the low noise amplifier on line 13 is coupled to a quadrature down converter 14. The output of the quadrature down converter 14 is shown having a real (Q) output on line 15 coupled to a low pass analog filter 17. The imaginary (I) output on line 16 is shown broken and it will be understood that the imaginary signal from the down converter 14 will be processed the same as the real (Q) output 15 to be described in greater detail hereinafter.

The output of the low pass analog filter 17 on line 18 is applied as a serial input to an analog to digital converter 19 to produce a parallel 4 to 8 bit digital output on line 22 which is coupled to a finite impulse response (FIR) filter 23. The output of the FIR filter on line 24 is shown as the S1 signal. The analog to digital converter is shown having a strobe input 21 which is generated at the micro-processor control to be described in greater detail hereinafter.

Refer now to FIG. 2 showing a schematic block diagram of the major elements of the novel acquisition and demodulation system which operate simultaneously but in an asynchronous mode of operation. The S1 signal on line 24 is shown being applied to a digital despreader 25 which removes the PN signal and produces a despread data signal on line 26 comprising the soft decision correlated outputs of a complete block of information divided into data symbol time divisions $T_s$ each of which comprise a plurality of chip times $T_c$. At the end of the storage of the burst of information in ram buffer 27, selected soft decision information is read out on line 28 to the digital demodulator 29 where the carrier phase shift information is removed. As will be explained hereinafter the digital demodulator 29 and the circuits associated therewith produce a non real time stream of demodulated data on line 31. The microprocessor and timing control block 32 is shown having an information and command bus 33 and a timing and control line 21 which are shown connected to the despreador 25, the RAM 27 and the demodulator 29. A separate timing line 21A is shown coupled from the digital demodulator 29 to the micro-processor and timing controls 32 which is indicative of supplying information for timing to the block 32.

Refer now to FIG. 3 showing a detailed schematic block diagram of the acquisition and demodulation system shown in FIG. 2. The S1 information on line 24 preferably comprises 4 to 8 bits used to quantizite the analog signal at each of the chips times $T_c$. For the purpose of explaining the operation of the correlator and acquisition circuits, assume that the parallel correlator is N chips wide and that N is greater than the window of uncertainty, thus, any burst of information received on line 24 can be matched by a PN replica code when searched over the window of uncertainty.

The parallel correlator 34 is shown having a PN despread parallel output 35 coupled to a summing circuit 36. The parallel output of summing circuit 36 on line 37 is coupled to a delay line having a plurality of N taps. Preferably the delay line 38 may be implemented as a shift register or a tapped delay line. The N parallel outputs of the delay circuit 38 on lines 39 are loaded into a buffer 41 in parallel and then strobed out on line 42 once each data symbol or bit time duration $T_s$. The serial output of delay line 38 on line 43 is applied to the summing circuit 36 to produce the summed output on line 37 applied to the delay line. The feedback circuit (shown at lines 43 and 37) creates a coherent accumulation of information over a data symbol time in the delay line 38. The accumulated information in delay line 38 is parallel loaded into buffer 41 during each symbol time and represents N times the amount of information at line 37. The N times information in buffer 41 is serially supplied at high speed to the absolute value detector 44 via line 42 and is applied as an output to a summing circuit 46 via line 45. The high speed output of the summing circuit 46 on line 47 is applied as an input to the delay line 48. Delay line 48 may be implemented as a shift register or tapped delay line and is shown having a feedback line 49 applied as an input to the summing circuit 46. A parallel output 51 from delay line 48 is shown being applied to buffer 52. Delay line 48 acts as a non-coherent accumulator over a large number of data symbol times $T_s$ before being read into buffer 52. At the end of the plurality of data symbol times (strobe $KT_s$) on line 21B strobes the information into buffer 52. This strobe is not the same strobe as the strobe on buffer 41 but is a longer strobe time used for a non-coherent accumulation. The data in buffer 52 is defined as a non-coherent accumulation of data and is applied via line 53 to a search and compare circuit 54 which compares the large number of outputs from buffer 52 with a pre-determined threshold used to eliminate non-candidate PN codes.

For each of the accumulations of a plurality of symbol times a decision is made whether the accumulation exceeds the threshold and this information is applied via bus 55 to a stage buffer 56. The number of stages in the buffer 56 is preferably large depending on the length of the burst since all of the burst information is stored in the stages for each decision. The stored information in stage buffer 56 is available via bus 57 to an estimating circuit 58. The estimating circuit 58 has sufficient information to make a determination whether the threshold and magnitude information is indicative of proper candidates for the replica PN code to lock onto the incoming information. The decision on line 59 to the microprocessor timing and control circuit 61 informs the circuits that a proper lock-on can be achieved, however, if the window of uncertainty has been missed it would be necessary for the microprocessor control circuit 61 to restart the PN generator 62 via line 63. Knowing that the system is now capable of locking on to the incoming PN coded the information from buffer 56 being supplied via line 64 to the refining logic circuit 65 can now be processed. Logic circuit 65 receives the information and is capable of determining where the start of the PN burst has occurred, also where the PN code doppler has changed throughout the entire burst, thus is capable of estimating the carrier doppler shift. The carrier doppler shift information and phase shift information on line 66 is applied to the digital demodulator 67 which operates in non real time.

The information accumulated in buffer 41 is applied via line 42 to the buffer RAM 68 once during each symbol time in parallel format. The width of the RAM buffer 68 thus has the same width as the parallel correlator 34.

Assume that the parallel correlator 34 is approximately 100 to 400 chips wide then the RAM buffer 68 is able to supply the candidates for the best PN sequence. The logic circuit 65 supplies on select line 69 the candidates for a best sequence which are read from the RAM buffer 68 into the select relevant data buffer 71. The data buffer 71 produces on lines 72 the best candidates for the proper PN sequence. Logic circuit 73, coupled to the buffer 71, reduces the plurality of choices of three or more candidates to provide the output of the best PN sequence on line 74 to RAM 75. The best sequence is now applied to the digital demodulator 67 to produce the preferred and desire data output on line 76.

Having explained a simplified mode of operation which comprises selecting a complete burst of information produced by the parallel correlator 34 at its parallel output lines, it will be understood that the RAM buffer 68 stores the N times T, soft decision information in parallel in buffer 68. The non synchronous selection of a single burst of information can be offset up to one-half of one chip in the window of uncertainty, thus could result in a 6 DB signal degradation. In order to overcome this performance degradation due to a misalignment of a fraction of a chip the present invention makes it possible to recover 3 or more best data information candidates on line 72 to the logic circuit 73 and to combine the best choices to produce the best alignment soft decision on line 74 to RAM 75. This soft decision data produces a properly aligned bit of information to the digital demodulator 67 which has a correction phase error signal applied via line 66 to the demodulator 67 to produce the maximum and best data output signal on line 76.

Having explained how the proper soft decision information is selected from literally hundreds of possible candidates it will be appreciated that the PN generator 62 was started at a time which was predetermined to align within a fraction of one chip with the incoming burst knowing when the incoming burst was going to arrive within the window of uncertainty as defined by the output of the parallel correlator 34. Thus, the PN generator 62 must supply a proper PN code to the PN code block shift registers 77 which produces the code information on bus 78 in parallel format to the buffer 79. The buffer 79 is enabled to then supply a value for each of the chips in the N chips wide buffer 79 and N chips wide parallel correlator 34 for purposes of performing parallel correlation which will be explained in greater detail hereinafter. It will be understood that at each sequential N chip time the PN code block shift register 77 is changed to supply a new block of chip values on line 81 which is N chips wide as indicated by the values $V_o$ through $V_{n-1}$.

Refer now to FIG. 4 showing a more detailed schematic block diagram of a preferred embodiment parallel correlator of the type used in FIG. 3. The preferred embodiment correlator 34 is shown having an input line 24 which supplies digital information in 4 to 8 bit serial format to a first delay 82 which is shown having a single chip delay $T_c$. The output of delay 82 on line 83 is applied to a second delay 84 having an output 85 applied to a third delay 86 etc. etc. The output from the next to last delay shown on line 87 is applied to the last delay 88 having an output 89. Each of the chip values $V_O$ through $V_{n-1}$ are representative of PN codes and are applied respectively to multipliers 91 through 94 to produce multiplied outputs on lines 95 through 98 respectively. The outputs 95 through 98 are applied to a summing circuit 99 (inside of the correlator 34 shown in FIG. 3) to produce an output on line 35 also shown on FIG. 3. It will be understood that the same correlator 34 shown having input values $V_O$ through $V_{n-1}$ which change every N chip time to load a new set of $V_O$ through $V_{n-1}$ values in the correlator. The switching time for loading the values $V_O$ through $V_{n-1}$ is substantially smaller than a chip time, thus the correlation operation on blocks of information N chips wide is occurring in real time. While the correlator is operating in real time the data which was stored in RAM buffer 68 is subsequently selected and applied via circuit 71, 72 and 73 to the RAM 75 to be demodulated and to produce the data output on line 76 in non-real time.

It will be appreciated that the micro-processor and timing control circuit 61 is coupled to each of the elements shown in FIG. 3 which require timing. The timing signals on lines which are numbered the same does not necessarily mean the timing signal is identical. The strobe 21 to A/D converter 19 is always imperfect and can only be corrected after the start of a burst. The strobe signal on line 21 to buffer 41 is timed imperfect and may be misaligned from the received data symbol timing by N chips. However, by aligning the data symbol strobe $T_s$ on line 21 to occur in the center of window of uncertainty, the symbol timing error will always be N/2 or less chips. This timing imperfection can be shown to be less than one percent for a window having 1,000 chip and having 100,000 chips per bit which is feasible for a high performance gain system having 50 db processing gain.

Having explained a preferred embodiment of the present invention it will now be appreciated that the acquisition and demodulation circuit shown in FIG. 3 can be employed in a high processing gain acquisition system using a parallel correlator which is not as wide as the burst of information which is received. Thus, the parallel correlator effectively processes sub portions of the burst of information only N chips wide but the chip length embraces the window of uncertainty and the processed soft decision information for the complete burst is stored. A large amount of soft decision information is stored in the RAM buffer 68 for each data bit and used for a subsequent selection in non-real time. The acquisition and demodulation circuit shown in FIGS. 3 and 4 are capable of receiving and processing a burst of information, partially demodulating/spreading the burst of information, and then subsequently demodulating the soft decision information to acquire the PN code when the original replica code was operated within the window of uncertainty.

The real time portion of the system is operating on the PN code being supplied on bus 78, whereas the non-real time portion of the circuit which includes digital demodulator 67 is operating at an entirely different time from PN code 1 shown on line 101 to digital demodulator 67. Preferably the demodulator 67 is run at its highest possible speed to enable the demodulator to access RAM 75 a plurality of times while demodulating preliminary or soft decision data to produce final hard decision data on line 76.

Having explained a detailed preferred mode of operation wherein the parallel correlator 34 is on line and operable when a burst of information is received for processing that the burst has no header or synchronizing data employed in the present invention demodulator so long as the width N of the correlator embraces the window of uncertainty less than N chips.

The first bit of data received in the correlator 34 is processed by a replica code generated at buffer 79 that may not be in perfect sync, however since all possible in sync replica codes are represented by the parallel outputs on line 35 and processed for one bit time, there well be generated soft decision data on line 42 from buffer which is indicative of the proper perfect sync PN code. This information from buffer 41 is also processed in the noncoherent accumulator 48–52 over a plurality of $T_s$ bit times ($KT_s$). If the factor K is properly selected, on first try a signal is raised on line 69 which enables the logic circuits 71 and 73 to identify a unique soft decision in RAM which identifies the perfect sync PN code on line 63.

Thus within several bit times $T_S$, the PN generator 62 is resynced so that a proper replica code is aligned with received PN code at very high performance gain.

If the sync signal 21 at block 19 is off by one half of one chip the signal to noise ratio would be down by 6 decimals, but can be rapidly adjusted for the remainder of the burst employing the novel circuit shown in FIGS. 3 and 4.

Using state of the art technology, the novel correlation 34 may be extended to about N=1000. In this event the bit time $T_S$, if extended over 10,000 chips, a signal to noise ratio of the operable system would only be down 40 db. If $T_S$ is extended to 100,000 chips the attenuation loss drops to 50 db and it is well known in this art that operable systems are effective in this loss range.

Whatever the initial loss, the present system rapidly adjust itself to overcome most of the random offset loss and substantially synchronizes on the incoming PN signal even when operating in a burst mode without a sync header.

We claim:

1. Apparatus for acquiring and demodulating burst of long PN coded spread spectrum signals having known data bit symbol and chip times and length but no preamble synchronizing signals, comprising:

analog receiver means for receiving blocks of the long burst of PN coded signals and producing a digital output representative of a plurality of data bits defined by a larger plurality of chips, correlator means N chips wide coupled to the output of said receiver means for producing a parallel partially despread block output N chips wide, where N is a small fractional part of the total number of chips in a data bit, coherent accumulating means coupled to the output of said correlator means for producing in real time once each bit symbol time $T_s$ a plurality N of preliminary soft decision data, at least one soft decision being indicative of the proper PN replica code alignment and the encoded bit of data received during the previous bit symbol time, buffer storage mean coupled to the output of said coherent accumulation means for receiving and storing the soft decision data representative of the bursts of PN coded signals, logic selection mean coupled to the buffer storage means for selecting relevant soft decision data indicative of the best estimate of the PN replica code and the encoded data, said buffer storage means comprising means for determining the start of a burst of PN coded carrier signals, and digital demodulation means coupled to the output of said logic selection means and to said means for determining the start of a burst of PN coded carrier signals for demodulating said soft decision data and producing a final hard best estimate data output.

2. Apparatus as set forth in claim 1 wherein the value of N is greater than the number of chips in the window of uncertainty.

3. Apparatus as set forth in claim 2 where the value N is between 20 and 2000 chips.

4. Apparatus as set forth in claim 3 wherein the number of chips in a bit symbol time is from 10 to 3000 times the value of N.

5. Apparatus as set forth in claim 1 wherein said digital demodulator means comprises a buffer memory for storing said best estimate of soft decision data for demodulation in non real time.

6. Apparatus as set forth in claim 5 which further includes processor means coupled to said logic selection means and said digital demodulator means for controlling the input of soft decision data to said demodulation means.

7. Apparatus as set forth in claim 6 which further includes PN replica generator means coupled to said processor means and said correlator means and wherein said processor means is adapted to control the output of said PN replica generator means.

8. Apparatus as set forth in claim 1 which further includes non-coherent accumulation means coupled to the output of said coherent accumulation means for generating a selection signal coupled to said logic selection means indicative of a condition in which a unique PN code is identifiable as a best estimate of the soft decision data.

9. Apparatus as set forth in claim 8 wherein said logic selection means includes means for selecting a plurality of soft decision data values and for reducing said plurality of soft decision data values to a unique best estimate soft decision value.

10. Apparatus as set forth in claim 9 wherein said means for selecting and reducing said soft decision data includes means for generating average values of soft decision data.

11. A method of rapidly acquiring long burst of PN coded spread spectrum signals having known data bit symbol times and chip times and length but having no preamble synchronizing signals, comprising the steps of:

receiving blocks of analog PN coded signals, converting said blocks of analog signals to digital signals, correlating said digital signals to provide a plurality N of multiplied and summed parallel partially despread soft decision data signals, coherently accumulating said parallel partially despread signals over a symbol bit time to provide N soft decision values, where the value N is a fraction of the data bit symbol time in chips, storing said N soft decision values in a high speed buffer memory, non-coherently accumulating said N soft decision values over a plurality of bit symbol times to identify the start of the PN replica code, selecting soft decision values from said high speed buffer memory indicative of the best estimate of the aligned PN replica code and a soft decision data value, applying the selected soft decision values to logic means for reducing said plural of soft decision values to a unique soft decision value, and demodulating the plurality of said unique soft decision values to provide a best estimate hard decision data output.

* * * * *